United States Patent
Galat et al.

(10) Patent No.: US 11,021,196 B2
(45) Date of Patent: Jun. 1, 2021

(54) TRACK ASSEMBLY FOR A MACHINE

(71) Applicant: Caterpillar Inc., Deerfield, IL (US)

(72) Inventors: Michael S. Galat, Peoria, IL (US); Temitope O. Akinlua, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 428 days.

(21) Appl. No.: 16/019,117

(22) Filed: Jun. 26, 2018

(65) Prior Publication Data

US 2019/0389522 A1 Dec. 26, 2019

(51) Int. Cl.
*B62D 55/21* (2006.01)
*B62D 55/28* (2006.01)
*B62D 55/088* (2006.01)

(52) U.S. Cl.
CPC ......... *B62D 55/21* (2013.01); *B62D 55/0887* (2013.01); *B62D 55/28* (2013.01)

(58) Field of Classification Search
CPC ...... B62D 55/21; B62D 55/20; B62D 55/205; B62D 55/211; B62D 55/275; B62D 55/28; B62D 55/26
See application file for complete search history.

(56) References Cited

U.S. PATENT DOCUMENTS

| | | |
|---|---|---|
| 3,260,558 A | 7/1966 | Popp |
| 4,423,910 A | 1/1984 | Narang |
| 4,765,694 A | 8/1988 | Cory |
| 7,219,968 B2 * | 5/2007 | Hisamatsu ............. B62D 55/21 305/195 |
| 9,533,722 B2 * | 1/2017 | Haut ..................... B62D 55/12 |
| 2008/0231110 A1 * | 9/2008 | Mulligan ........... B62D 55/0887 305/103 |
| 2009/0045674 A1 * | 2/2009 | Maeda ................ B62D 55/205 305/198 |
| 2015/0061372 A1 * | 3/2015 | Kaufmann ......... B62D 55/0887 305/104 |
| 2015/0344088 A1 * | 12/2015 | Hakes ................. B62D 55/202 305/137 |

FOREIGN PATENT DOCUMENTS

| | | | |
|---|---|---|---|
| CN | 103407505 A | 11/2013 | |
| CN | 107571927 A | 1/2018 | |
| GB | 2089747 B | 8/1984 | |
| JP | 52047230 A * | 4/1977 | ............. B62D 55/20 |
| JP | 05286464 A * | 11/1993 | ............. B62D 55/20 |

* cited by examiner

*Primary Examiner* — Jason R Bellinger
(74) *Attorney, Agent, or Firm* — Bookoff McAndrews

(57) ABSTRACT

A track link assembly comprises a plurality of link subassemblies. Each link subassembly may include a pair of links coupled together. Each link may include a first aperture and a second aperture, and the second aperture of each link may be larger than the first aperture. The track link assembly may include a pin element extending through the first aperture of a first link and the second aperture of a second link in each link subassembly. The track link assembly may include a bushing element with a central opening. The bushing element may surround a portion of the pin element and extend through the second aperture of the second link of each link subassembly. The bushing element may include at least one hole configured to couple a track shoe to the bushing element.

20 Claims, 4 Drawing Sheets

TRACK ASSEMBLY FOR A MACHINE

TECHNICAL FIELD

The present disclosure relates generally to a track assembly for a machine, and more particularly, to an arrangement for coupling track shoes to the track assembly of a machine.

BACKGROUND

Track type machines typically utilize track chains on each side of the machine to engage the ground surface to propel the machine. A plurality of individual links are pivotably coupled via bushing and pin arrangements to form the track chain. Individual links that form the track chains are connected to ground engaging elements, known as track shoes, to move the machine. A sprocket, driven by an engine of the machine, engages and translates the track chain about spaced apart pulley mechanisms. As the track chain translates, the connected track shoes engage a ground surface under the machine and propel the machine on the ground surface. The track shoes are often bolted to the individual links, which requires thicker links and bolts than are otherwise required to support and propel the machine. Such track links are also usually formed of forged steel, increasing the costs and time of manufacture and assembly. Track links and track shoes often wear over time at different rates, and thus may need to be replaced and/or serviced at different rates. As such, costs of production and maintenance are often important considerations in the manufacture and assembly of the track chain.

An exemplary track chain is disclosed in U.S. Pat. No. 3,260,558 ("the '558 patent") to Popp. The '558 patent discloses a track assembly that includes a plurality of link bodies coupled together to form an endless traction chain. The link bodies of the '558 patent include protrusions or gripping portions that extend toward and at least partially engage the ground surface in order to propel the machine. However, the links and gripping portions of the '558 patent are integrally formed or molded, and thus are not separately replaceable or serviceable. While the track links of the '558 patent may be suitable for some applications, they may not be suitable for other applications. The disclosed link assembly and arrangement may solve one or more of the problems set forth above and/or other problems in the art. The scope of the current disclosure, however, is defined by the attached claims, and not by the ability to solve any specific problem.

SUMMARY

In one aspect, a track link assembly may include a plurality of link subassemblies. Each link subassembly may include a pair of links coupled together. Each link may include a first aperture and a second aperture, and the second aperture of each link may be larger than the first aperture. The track link assembly may include a pin element extending through the first aperture of a first link and the second aperture of a second link in each link subassembly. The track link assembly may include a bushing element with a central opening. The bushing element may surround a portion of the pin element and extend through the second aperture of the second link of each link subassembly. The bushing element may include at least one hole configured to couple a track shoe to the bushing element.

In another aspect, a track link component may include a bushing element to pivotably connect adjacent track links, and the bushing element may be an integrally formed piece of metal and may include a central portion and two end portions on opposite sides of the central portion. The bushing element may be generally cylindrical and may include an opening extending through a longitudinal axis of the bushing element. The bushing element may include a plurality of holes on an exterior and extending radially inward toward the opening.

In a further aspect, a track link may include a first portion at one end of the track link and a second portion at another end of the track link and extending parallel to the first portion. The track link may include an angled portion between the first portion and the second portion, a first aperture in the first portion, and a second aperture in the second portion. The first aperture and the second aperture may be spaced apart along a longitudinal axis of the track link, and the second aperture may be larger than at least a portion of the first aperture. The track link may not include holes or coupling portions configured to couple a track shoe to the track link.

DETAILED DESCRIPTION

Both the foregoing general description and the following detailed description are exemplary and explanatory only and are not restrictive of the features, as claimed. As used herein, the terms "comprises," "comprising," "having, including," or other variations thereof, are intended to cover a non-exclusive inclusion such that a process, method, article, or apparatus that comprises a list of elements does not include only those elements, but may include other elements not expressly listed or inherent to such a process, method, article, or apparatus. For the purpose of this disclosure, the term "ground surface" is broadly used to refer to all types of material that is traversed (e.g., dirt, rocks, clay, sand, asphalt, cement, etc.). Moreover, in this disclosure, relative terms, such as, for example, "about," "substantially," and "approximately" are used to indicate a possible variation of ±10% in the stated value.

Figure 1:
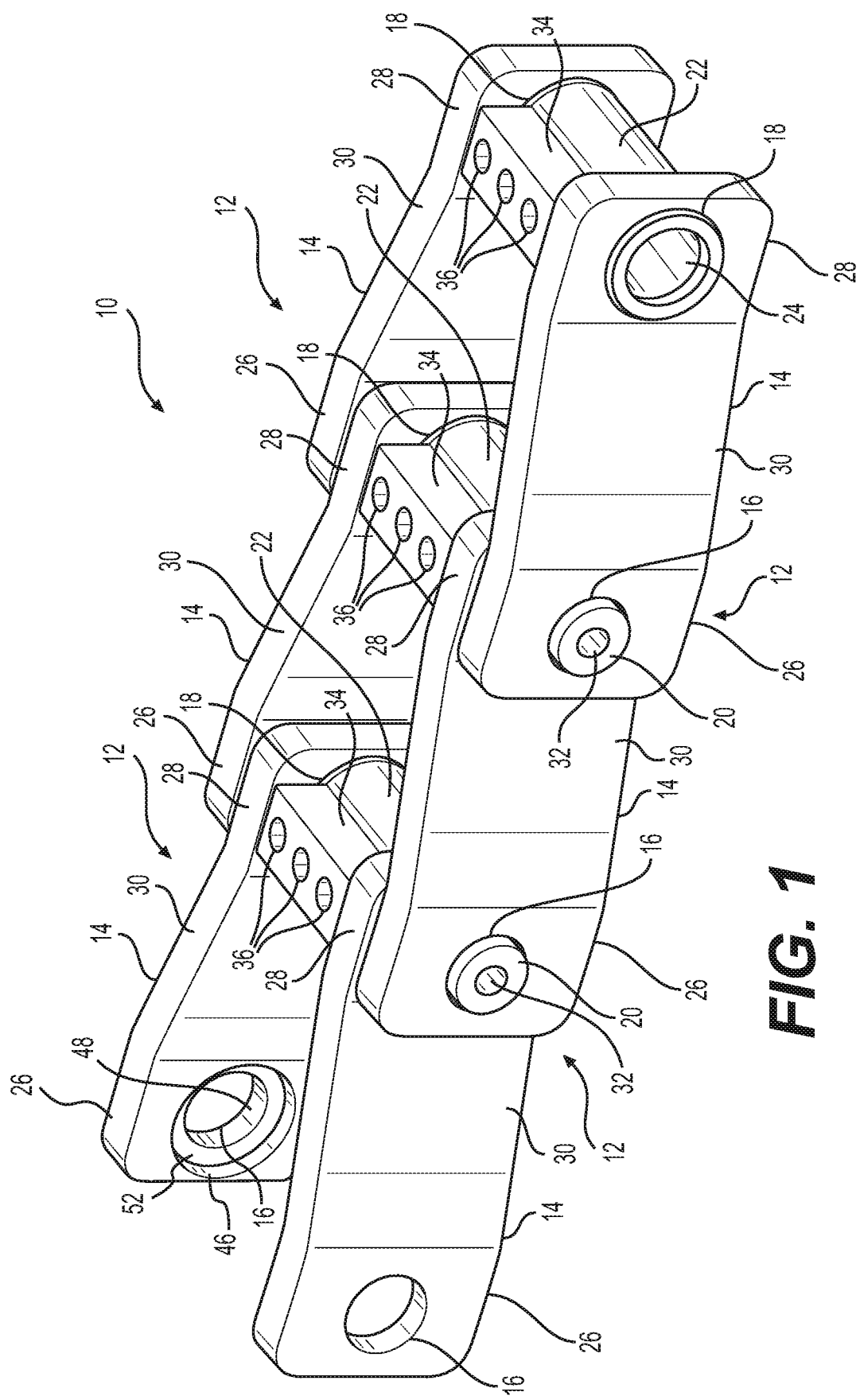
FIG. 1 is a perspective view of a portion of an exemplary track link assembly.

FIG. 1 illustrates a perspective view of a portion of an exemplary track link assembly 10, according to the present disclosure. Track link assembly 10 may be coupled to any mobile machine that performs some type of operation with an industry such as mining, construction, farming, transportation, or any other industry known in the art. For example, track link assembly 10 may be coupled to an undercarriage assembly and driven by a power source of an excavator, a dozer, a loader, a backhoe, a motor grader, or any other earth moving machine. A separate track assembly 10 may be coupled to each side of the machine and form separate endless loops. Although not shown, a plurality of track shoes may be coupled to an outer surface of track link assembly 10 in order to aid in the engagement of the ground surface.

As shown in FIG. 1, track link assembly 10 may be an offset link chain that includes multiple structurally similar link subassemblies 12 that each include a pair of laterally spaced apart and offset links 14. Each link 14 includes apertures (first aperture 16 and second aperture 18) at respective opposite ends and/or spaced apart along a longitudinal axis of each link 14. A first pair of links 14 may form a portion of one side of track link assembly 10, and a second pair of links 14 may form a portion of the other side of track link assembly 10.

Figure 2:
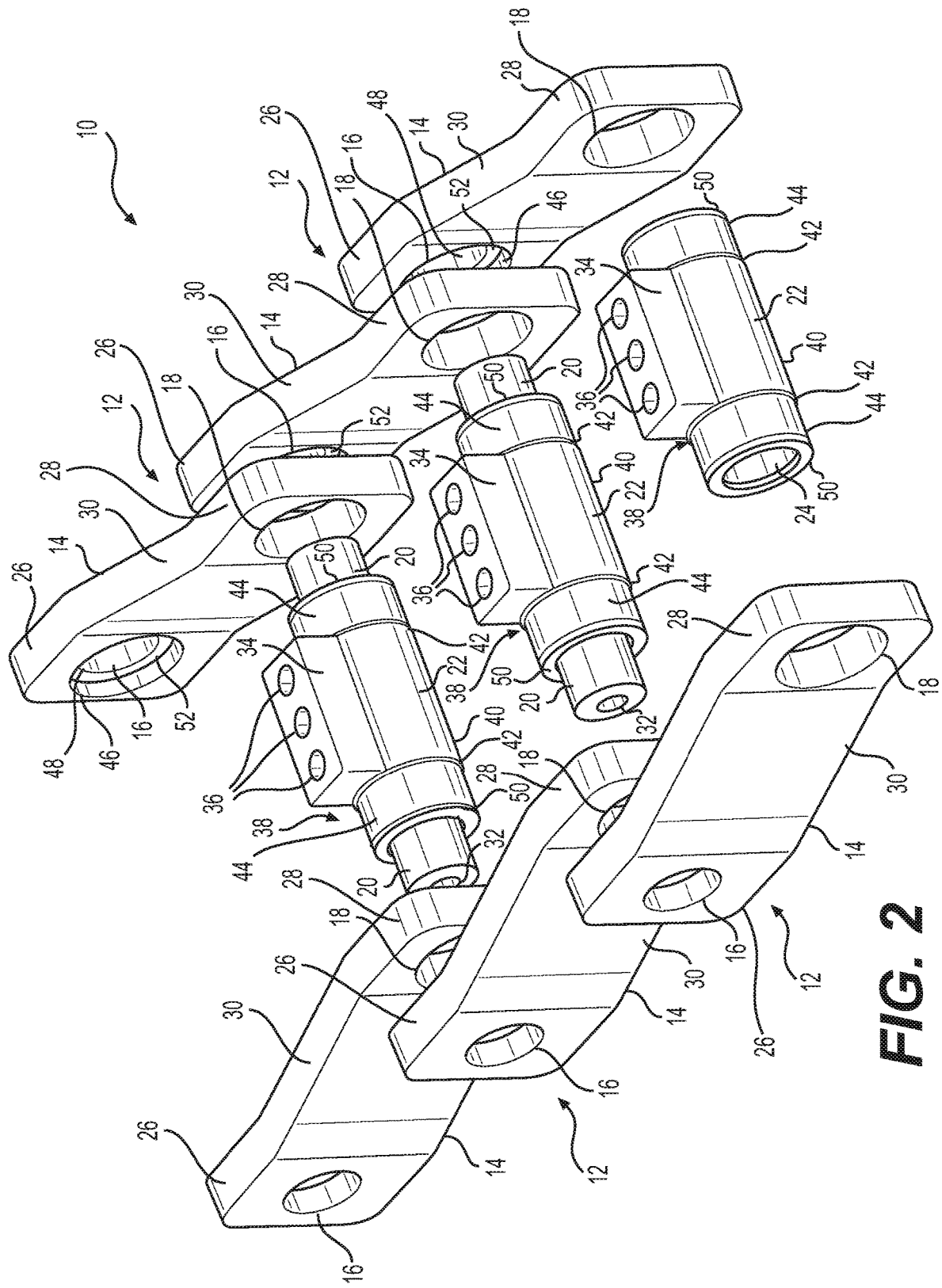
FIG. 2 is a partially exploded view of the track link assembly of FIG. 1.

Individual subassemblies 12 of links 14 are coupled by a pin 20 and a bushing 22. Respective pins 20 may be positioned within an opening 24 extending through respective bushings 22. Each pin 20 may extend though portions of adjacent, laterally spaced apart pairs of links 14 in order to rotatably couple adjacent pairs of links 14. For example, pin 20 may pass through first apertures 16 of two forward links 14 and through second apertures 18 of two rear links 14 to connect two link subassemblies 12 (FIG. 2). Additionally, bushing 22 may pass through second apertures 18 of the rear links 14. As shown in FIG. 1, pin 20 and bushing 22 couple a plurality of link subassemblies 12 together to form a portion of track link assembly 10. Although not shown, track link assembly 10 may include a master link assembly that couples two free ends of the chain to form an endless track chain (i.e., a chain that forms an endless loop). Furthermore, it is noted that, for clarity, the right end of the depicted portion of track assembly 10 in FIGS. 1 and 2 is shown without pin 20, and the left end of the depicted portion of track assembly 10 is shown without pin 20 and bushing 22.

As mentioned, links 14 may be offset links. In particular, each link 14 may include at least a first portion 26, a second portion 28, and an angled portion 30 extending between first portion 26 and second portion 28. First portion 26 may include first aperture 16, and second portion 28 may include second aperture 18. First portion 26 and second portion 28 may be substantially parallel to each other. When coupled to form track link assembly 10, first portion 26 of each link 14 may be positioned exterior (i.e., away from bushing 22) to second portion 28 of another link 14, forming link subassembly 12 when coupled via pin 20 and bushing 22. Each link 14 may include a substantially constant thickness, and may be formed of steel or another appropriate metal. For example, each link 14 may be cut or pressed out of plate steel or another metal. The metal may be pre-bent to form first portion 26, second portion 28, and angled portion 30, or the metal may be cut and then bent to form portions 26, 28, and 30. Moreover, first aperture 16 and second aperture 18 may be cut, punched out, or otherwise formed in the metal that forms each link 14. Once the metal has been formed to the desired shape of each link 14, the metal may be heat-treated in order to harden each link 14, which may help to reduce wear and increase durability of each link 14. Additionally, each link 14 may be "solid" except for first aperture 16 and second aperture 18. As used herein, "solid" means without any internal or external cavities, openings, or holes. Thus, by being solid, links 14 do not include any holes or coupling portions configured to fix, bolt, or otherwise secure a track shoe to any one of links 14.

Each pin 20 may be a substantially cylindrical rod, and may be sized to be slip fit through first aperture 16 and through opening 24 of bushing 22. In one aspect, each pin 20 may include a pin opening 32 extending through a central portion of pin 20. Pin opening 32 may receive a screw, bolt, or other securing member with a widened portion to help retain pin 20 in first aperture 16. Pin 20 may be formed of any appropriate metal, and may be heat-treated to harden pin 20.

Each bushing 22 includes a shoe extension 34 with a plurality of shoe holes 36. Shoe extension 34 may be substantially rectangular, and may extend radially away from an outer face 38 of bushing 22. As such, each bushing 22 may be generally cylindrical with a cylindrical channel extending therethrough to form opening 24. Each bushing 22 includes shoe extension 34 extending away from outer face 38, such that each bushing 22 includes a cross-section that is substantially circular with the exception of a substantially rectangular extension formed by shoe extension 34. A width of shoe extension 34 in a direction perpendicular to the longitudinal axis of bushing 22, for example, in a direction of travel of track assembly 10, may be approximately equal to a diameter of opening 24. In one aspect, the width of shoe extension 34 may be less than the diameter of opening 24, and in another aspect, the width of shoe extension 34 may be greater than the diameter of opening 24, for example, approximately equal to an outer diameter of bushing 22. An outer face of shoe extension 34 that includes shoe holes 36 may be substantially flat, which may help couple the track shoes to bushings 22 by providing a flat abutment between bushing 22 and the track shoe.

Figure 3:
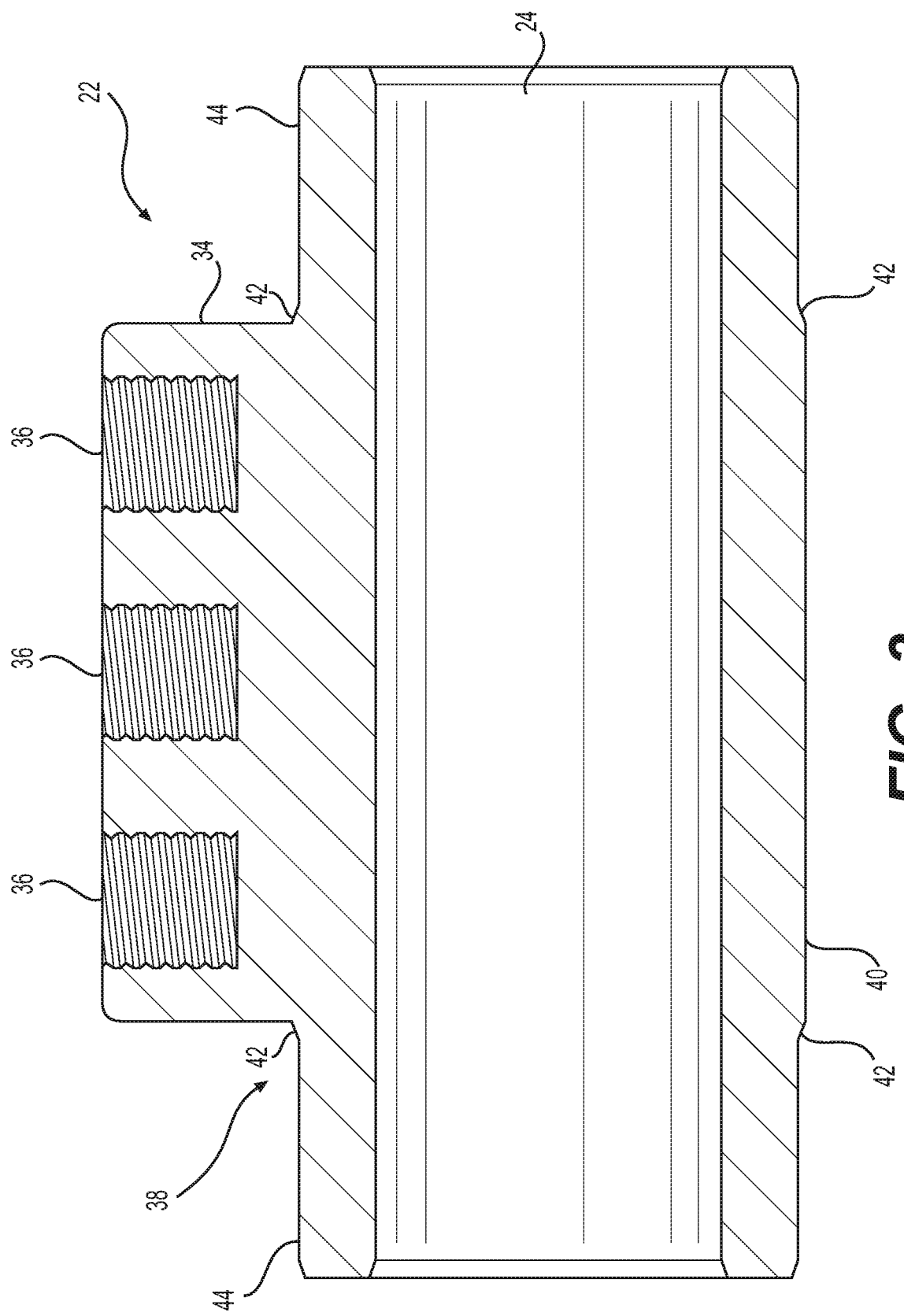
FIG. 3 is a cross-sectional view of an exemplary bushing of the track link assembly of FIG. 1.
Figure 4:
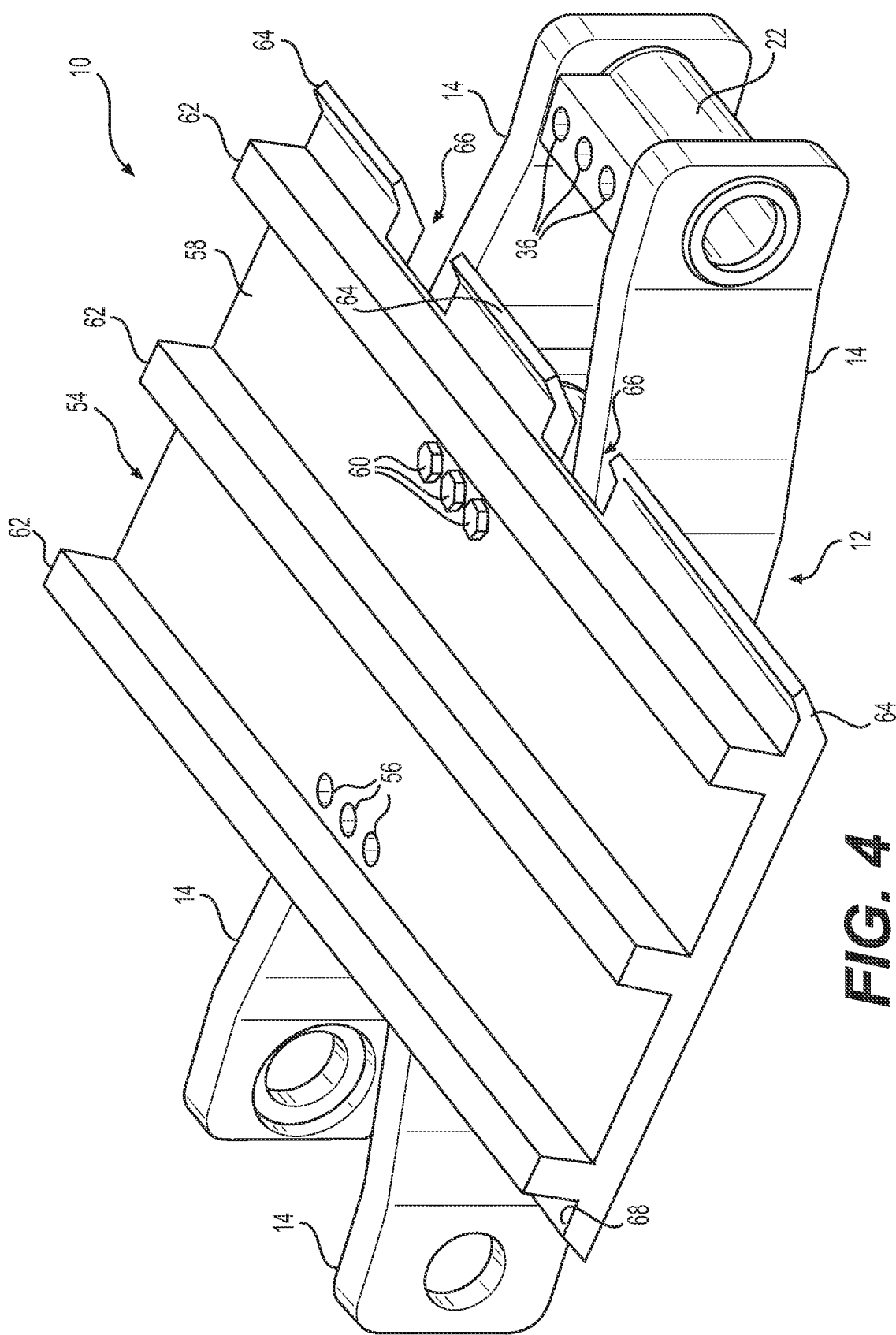
FIG. 4 is a perspective view of the portion of the track link assembly coupled to a track shoe.

Shoe holes 36 may extend inward from the exterior of shoe extension 34 toward outer face 38. Shoe holes 36 may be blind holes such that they do not extend into opening 24 (FIG. 3). Shoe holes 36 may also be threaded in order to lockably receive bolts, or other coupling elements to couple a track shoe to bushing 22 (FIG. 4). In one aspect, each shoe extension 34 may include three shoe holes 36, which may help to secure the track shoe to bushing 22. For example, each track shoe may include a number, size, and arrangement of holes that correspond to the number, size, and arrangement of shoe holes 36. The holes on the track shoes may also be threaded in order to help secure the coupling element to the track shoes and bushing 22. Although three shoes holes 36 are shown in FIGS. 1-3, this disclosure is not so limited, as shoe extension 34 may include one, two, four, or more shoe holes 36.

Each bushing 22 may be press fit or interference fit within two second apertures 18 of respective links 14 to form a fixed coupling. Pin 20 may be slip fit within opening 24 of bushing 22 to form a rotatable coupling, and the coupling between pin 20 and bushing 22 may include grease, oil, or another lubricant.

FIG. 2 illustrates a partially exploded view of the portion of track link assembly 10. As shown, bushing 22 may include a bushing extension 40, which may be a radially thicker portion. Bushing extension 40 may extend radially around a central portion of bushing 22, and may be substantially aligned with shoe extension 34. Bushing extension 40 may help to reduce wear on bushing 22 as a sprocket engages with bushing 22 to drive track link assembly 10. Bushing extension 40 may also form lips or stop surfaces 42 between bushing extension 40 and end portions 44 of bushing 22. Stop surfaces 42 may help to securely position bushing 22 in the press fit or interference fit arrangement within second apertures 18.

Furthermore, as shown in FIG. 2, first apertures 16 may include a wide portion 46 and a narrow portion 48. As shown in FIG. 1, pins 20 may extend through first apertures 16, that is, through both wide portion 46 and narrow portion 48. A portion of end portion 44 of bushings 22 may extend into at least a portion of wide portion 46. For example, wide portion 46 may be slightly radially wider than second aperture 18, such that link 14 with wide portion 46 and bushing 22 may pivot relative to each other.

One or more seals 50, for example, a rubber gasket or ring of another elastomeric material, may be positioned around pin 20. For example, seals 50 may be positioned around pin 20 on both sides of bushing 22. In one aspect, seals 50 may be coupled to bushing 22 and surround opposite sides of opening 24. When pin 20 and bushing 22 are coupled between links 14, as shown in FIG. 1, seals 50 may be compressed between end portions 44 of bushing 22 and an interior face 52 between wide portion 46 and narrow portion 48. As such, seals 50 may radially expand and form fluid-tight closures around pin 20 such that any lubricating material within opening 24 is contained within opening 24, which may help ensure the smooth rotation of pin 20 relative to bushing 22 over the lifetime of the link subassembly 12. It is noted that, in the sealed arrangement, bushing 22 and pin 20 are rotatable relative to one another.

FIG. 3 illustrates a cross-sectional view of bushing 22. As shown, opening 24 extends longitudinally through a portion of bushing 22. Additionally, shoe extension 34 and bushing extension 40 extend radially outward from bushing 22 to form stop surface 42. Shoe holes 36 extend inward from the exterior of shoe extension 34 toward, but not into, opening 24. Bushing 24 may be formed of forged or molded steel, and/or shoe holes 36 may be drilled or otherwise formed in shoe extension 34.

FIG. 4 illustrates a perspective view of the portion of track link assembly 10 with a track shoe 54. Track shoe 54 may be coupled to at least one bushing 22 via one or more holes 56 in a base plate 58 of track shoe 54. One or more coupling elements, for example, bolts 60, may extend through base plate 58 of track shoe 54 and into shoes holes 36 in shoe extension 34 of bushing 22. In one aspect, track shoe 54 may include two sets of holes 56 positioned in a central portion of track shoe 54 and spaced apart in the direction of travel of track link assembly 10. The position of holes 56 may correspond to the position of shoe holes 36 in adjacent bushings 22, for example, bushings 22 of adjacent link subassemblies 12 (see, e.g., FIG. 2). Track shoe 54 may also include one or more extensions 62, such as ridges or grousers, extending from base plate 58 opposite to track link assembly 10. Track shoe 54 may also include an end extension 64 at one end of track shoe 54, and end extension 64 may extend at an angle from base plate 58. End extension 64 may be continuous over a width of track shoe 54, or may include one or more gaps 66, as shown in FIG. 4. Base plate 58 may also include an angled portion 68 on an end opposite to end extension 64, and angled portion 68 may be shaped to correspond to end extension 64 such that adjacent track shoes 54 may pivot relative to each other as track link assembly 10 drives the machine. The one or more extensions 62 and end extension 64 may help track shoe 54 engage the ground surface and propel the machine with track link assembly 10.

Although not shown, angled portion 68 may also include one or more gaps. Gaps 66 in end extension 64 and any gaps in angled portion 68 may be positioned one both sides of bolts 60. For example, gaps 66 in end extension 64 and any gaps in angled portion 68 may be substantially aligned with the top portion of links 14. Gaps 66 in end extension 64 and any gaps in angled portion 68 may be at least partially wider than links 14, which may help to allow at least a portion of link 14 to be received within a portion of track shoe 54, for example, when links 14 are following a curved path such as over a sprocket. Alternatively or additionally, although not shown, gaps 66 may connect to gaps in angled portion 68 via one or more longitudinally extending grooves in a bottom portion of track shoe 54, which may aid in the coupling of track shoe 54 to one or more link subassemblies 12.

INDUSTRIAL APPLICABILITY

The disclosed aspects of track link assembly 10 may be used in any machine that includes a tracked undercarriage that includes links coupled together to form one or more tracks. Track link assembly 10 described herein may provide a strong and durable connection between links 14 and track shoes 54, with a reduced number of components and lower likelihood of requiring maintenance or replacement. Therefore, the disclosed track link assembly 10 may be reliable and low cost, without sacrificing performance.

Each link 14 includes a first aperture 16 and a second aperture 18, and the links 14 are coupled by pin 20 and bushing 22. Bushing 22 is fixedly coupled to a first, or inner, link 14 via end portion 44, and pin 20 is rotatably or pivotably coupled to a second, or outer, link 14. During operation of the machine, adjacent links 14 of link subassemblies 12 pivot relative to each other. In particular, an inner link 14 of adjacent links 14 is coupled to bushing 22 with end portion 44 interference fit or press fit through second aperture 18 to form a fixed coupling. An outer link 14 of the adjacent links 14 is coupled to pin 20 with pin 20 slip fit through first aperture 16 to allow for relative pivoting. Because the track shoes 54 are coupled to bushing 22, rather than to links 14, links 14 may be formed of thinner metal, for example, plate steel. Links 14 may be more easily produced and/or less expensive than existing track links that include a plurality of holes that, along with bolts and nuts, secure the track shoes to the thicker track links. For example, links 14 may be cut from plate steel and not require separate molding or forging, potentially reducing the costs of production, assembly, and maintenance.

Bushing 22 includes shoe extension 34 with shoe holes 36. Coupling elements, for example, bolts 60, may extend through a portion of the track shoe 54 and into shoe holes 36 to couple the track shoe to bushing 22. Bushing extension 40 may also help reduce wear on bushing 22, as the increased radial thickness of bushing extension 40 may engage with one or more sprockets in order to drive track link assembly 10, which may increase the durability and lifetime of bushing 22. Additionally, bushing 22 may be integrally formed (i.e., molded or forged) from, for example, steel. It is noted that the production of bushing 22 may be more time or cost intensive than conventional bushings, but that any time or cost increases are outweighed by the reduction in time and costs for the forming of links 14. Bushing 22 may also be heat treated to harden the molded material, and bushing 22 may be heated at a hotter temperature and for a longer duration than conventional bushings and/or other track components because there is a reduced risk of damaging the connections as bushing 22 is a single element. As such, bushing 22 may be hardened to a deep depth.

Moreover, bushing 22 may also include a greater surface area in a direction transverse to the direction of travel of track link assembly 10 than the links of conventional track link assemblies. Therefore, bushing 22 may help to securely couple the track shoe 54 to track link assembly 10 because shoe extension 34 may include a plurality of shoe holes 36, allowing for a plurality of screws, bolts 60, or coupling elements to couple the track shoe 54 to bushing 22. Moreover, the plurality of screws, bolts, or coupling elements may be smaller than the coupling elements conventionally used to couple the track shoes to the track links. The greater number of smaller coupling elements along with the flat surface formed by shoe extension 34 may help to increase the secure connection between the track shoe 54 and bushing 22. Furthermore, the plurality of coupling elements may help in the maintenance and operation of track link assembly 10, as the track shoes 54 may be more easily coupled and uncoupled to bushings 22, for example, in order for a user to inspect the track link assembly 10, replace the track shoes, or otherwise maintain track link assembly 10.

It will be apparent to those skilled in the art that various modifications and variations can be made to the disclosed system without departing from the scope of the disclosure. Other embodiments of the system will be apparent to those skilled in the art from consideration of the specification and practice of the track link assembly disclosed herein. It is intended that the specification and examples be considered as exemplary only, with a true scope of the disclosure being indicated by the following claims and their equivalents.

What is claimed is:

1. A track link assembly, comprising:
a plurality of link subassemblies, wherein each link subassembly includes a pair of links coupled together, wherein each link includes a first aperture and a second aperture, and wherein the second aperture of each link is larger than the first aperture;
a pin element extending through the first aperture of a first link and the second aperture of a second link in each link subassembly; and
a bushing element with a central opening, wherein the bushing element surrounds a portion of the pin element and extends through the second aperture of the second link of each link subassembly, and wherein the bushing element includes at least one hole configured to couple a track shoe to the bushing element.

2. The track link assembly of claim 1, wherein the bushing element is a single element formed of forged and heat treated steel.

3. The track link assembly of claim 1, wherein the bushing element includes a shoe extension portion that extends radially away from the central opening, and wherein the at least one hole extends radially inward from an exterior of the shoe extension portion.

4. The track link assembly of claim 3, wherein the shoe extension portion is substantially rectangular, wherein the bushing element includes a bushing extension portion that extends radially away from the central opening of the bushing, and wherein the bushing extension portion is at least partially aligned with the shoe extension portion along the longitudinal axis of the bushing element.

5. The track link assembly of claim 4, wherein the shoe extension portion includes a plurality of holes configured to couple a track shoe to the bushing element, and wherein each of the plurality of holes is threaded.

6. The track link assembly of claim 1, wherein the bushing element is interference fit within the second aperture, and wherein the pin element is slip fit within the first aperture.

7. The track link assembly of claim 1, wherein the links are formed of plate steel, wherein each link includes a first portion, a second portion, and an angled portion extending between the first portion and the second portion, wherein an inner link of a first link subassembly is an outer link of a laterally adjacent link subassembly, and wherein the links do not include holes or coupling portions configured to couple a track shoe to the link.

8. The track link assembly of claim 1, wherein the first aperture includes a wide portion and a narrow portion, and wherein the wide portion includes a larger diameter than the second aperture.

9. The track link assembly of claim 8, further including a sealing element, wherein the sealing element is positioned between an end portion of the bushing element and the narrow portion of the first aperture.

10. The track link assembly of claim 1, further including at least one track shoe coupled to the bushing element with one or more bolts extending through one or more portions of the at least one track shoe and into the at least one hole.

11. A track link component, comprising:
a bushing element to pivotably connect adjacent track links, wherein the bushing element is an integrally formed piece of metal and includes a central portion and two end portions on opposite sides of the central portion,
wherein the bushing element is generally cylindrical and includes an opening extending through a longitudinal axis of the bushing element, and
wherein the bushing element includes a plurality of holes on an exterior and extending radially inward toward the opening, and wherein the plurality of holes are configured to couple a track shoe to the bushing element.

12. The track link component of claim 11, wherein the bushing element is formed of heat treated steel.

13. The track link component of claim 11, wherein the bushing element includes a shoe extension portion that extends radially away from the central opening, and wherein the plurality of holes extend radially inward from an exterior of the shoe extension.

14. The track link component of claim 13, wherein the shoe extension portion is substantially rectangular, wherein the bushing element includes a bushing extension portion that extends radially away from the central opening of the bushing, and wherein the bushing extension portion is at least partially aligned with the shoe extension portion along the longitudinal axis of the bushing element.

15. The track link component of claim 11, wherein each of the plurality of holes is threaded.

16. A track link, comprising:
a first portion at one end of the track link;
a second portion at another end of the track link and extending parallel to the first portion;
an angled portion between the first portion and the second portion;
a first aperture in the first portion; and
a second aperture in the second portion,
wherein the first aperture and the second aperture are spaced apart along a longitudinal axis of the track link, wherein the second aperture is larger than at least a portion of the first aperture, and wherein the track link does not include holes or coupling portions configured to couple a track shoe to the track link.

17. The track link of claim 16, wherein the first aperture and the second aperture are circular.

18. The track link of claim 16, wherein the first aperture includes a wide portion and a narrow portion.

19. The track link of claim 18, wherein the wide portion includes a diameter larger than a diameter of the second aperture.

20. The track link of claim 16, wherein the track link is formed of plate steel.

* * * * *